United States Patent
Lu (10) Patent No.: US 8,047,391 B2
(45) Date of Patent: Nov. 1, 2011

(54) FOLDABLE AND PORTABLE FRAME

(75) Inventor: Kongzhi Lu, Xiamen (CN)

(73) Assignee: Xiamen Sunnypet Products Co., Ltd., Xiamen (CN)

( * ) Notice: Subject to any disclaimer, the term of this patent is extended or adjusted under 35 U.S.C. 154(b) by 859 days.

(21) Appl. No.: 11/424,116

(22) Filed: Jun. 14, 2006

(65) Prior Publication Data

US 2007/0251463 A1    Nov. 1, 2007

(30) Foreign Application Priority Data

Feb. 24, 2006    (CN) .......................... 2006 2 0004342

(51) Int. Cl.
| | |
|---|---|
| *B65D 30/10* | (2006.01) |
| *B65D 33/02* | (2006.01) |
| *B65D 25/00* | (2006.01) |
| *B65D 6/00* | (2006.01) |
| *B65D 8/14* | (2006.01) |
| *A45C 7/00* | (2006.01) |
| *A45C 13/04* | (2006.01) |
| *A45C 13/26* | (2006.01) |

(52) U.S. Cl. ............ 220/9.4; 220/9.1; 220/9.2; 220/9.3; 220/4.28; 220/4.33

(58) Field of Classification Search ................... 220/9.4, 220/9.1–9.3, 6, 1.5, 4.33, 4.34, 4.28; 217/12 R, 217/14, 15, 16; 108/115, 59, 162, 163; 248/95
See application file for complete search history.

(56) References Cited

U.S. PATENT DOCUMENTS

| | | | | |
|---|---|---|---|---|
| 3,410,328 A | * | 11/1968 | Sasai | 220/9.2 |
| 3,610,158 A | * | 10/1971 | Eidemanis | 104/17.1 |
| 3,687,328 A | * | 8/1972 | Spruyt et al. | 220/324 |
| 3,810,481 A | * | 5/1974 | Nohmura | 135/158 |
| 4,167,234 A | * | 9/1979 | Gordon et al. | 220/359.2 |
| 4,452,356 A | * | 6/1984 | Dahl | 426/128 |
| 5,274,980 A | * | 1/1994 | Zeigler | 52/646 |
| 5,566,701 A | * | 10/1996 | Grey | 135/98 |
| 5,722,552 A | * | 3/1998 | Olson | 220/9.2 |
| 5,957,310 A | * | 9/1999 | Mitchell | 211/186 |
| 6,045,037 A | * | 4/2000 | McGeehin | 229/125.39 |
| 6,112,931 A | * | 9/2000 | Booth et al. | 220/88.1 |
| 6,601,723 B1 | * | 8/2003 | Ziglar | 220/4.34 |
| 6,644,063 B2 | * | 11/2003 | Mogil | 62/457.2 |
| 2002/0137598 A1 | * | 9/2002 | Publicover et al. | 482/27 |
| 2005/0127072 A1 | * | 6/2005 | Schmidt | 220/4.28 |

FOREIGN PATENT DOCUMENTS

| | | |
|---|---|---|
| CN | 2178496 Y | 10/1994 |
| CN | 2314026 Y | 4/1999 |
| CN | 2357970 Y | 1/2000 |
| CN | 2655638 Y | 11/2004 |
| CN | 2678350 | * 2/2005 |
| CN | 2678350 Y | 2/2005 |

* cited by examiner

*Primary Examiner* — Mickey Yu
*Assistant Examiner* — Kareen Rush
(74) *Attorney, Agent, or Firm* — Jen-Feng Lee, Esq.

(57) ABSTRACT

A foldable and portable frame is disclosed. The foldable and portable frame comprises twelve posts and eight flexible joints or linkages. The foldable and portable frame can be easily erected to be a stable substantially rectangular structure, and folded to a collapsed state to be portable. A foldable and portable frame with coverings is also disclosed. The foldable and portable frame with coverings can be erected and folded in a same fashion as the erecting and folding of the foldable and portable frame.

25 Claims, 10 Drawing Sheets

FOLDABLE AND PORTABLE FRAME

BACKGROUND OF THE INVENTION

The present invention relates to a general mechanical frame structure. More specifically, the present invention relates to a multi-purpose collapsible and portable frame structure, for example, a portable pet housing structure.

BRIEF SUMMARY OF THE INVENTION

A foldable and portable frame and a foldable and portable frame with a covering are disclosed. The foldable and portable frame is a substantially rectangular structure when fully erected. The foldable and portable frame comprises twelve posts and eight joints or linkages. The frame can be folded to a collapsed state to be portable. A flexible covering is sized to extend over the entirety of the foldable and portable frame.

The present invention also discloses a foldable and portable frame with a covering including flexible sleeves covering all the posts of the frame. In addition, these flexible sleeves are attached to interior portions of the flexible covering.

One object of the present invention is to provide a frame that is easily erected and folded. When fully erected, the frame is a stable rectangular structure, which can be used for many purposes indoors and/or outdoors.

Another object of the present invention is to provide a frame that is easily portable when the frame is in a collapsed state.

Yet another object of the present invention is to provide a frame with a covering that can serve as a multi-purpose housing unit. Specifically, a foldable and portable frame with a covering to serve as a portable pet house.

Therefore, in accordance with the previous summary, objects, features and advantages, the present disclosure will become more apparent to a person of the ordinary skill in the art from the following description and the appended claims when taken in conjunction with the accompanying drawings.

DETAILED DESCRIPTION OF THE INVENTION

The present disclosure can be described by the embodiments given below. It is understood, however, that the embodiments below are not necessarily limitations to the present disclosure, but are used to describe a typical implementation of the invention.

The present invention provides an unique foldable and portable frame and the use thereof. It is understood, however, that the following disclosure provides many different embodiments, or examples, for implementing different features of the invention. Specific examples of components and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1A:
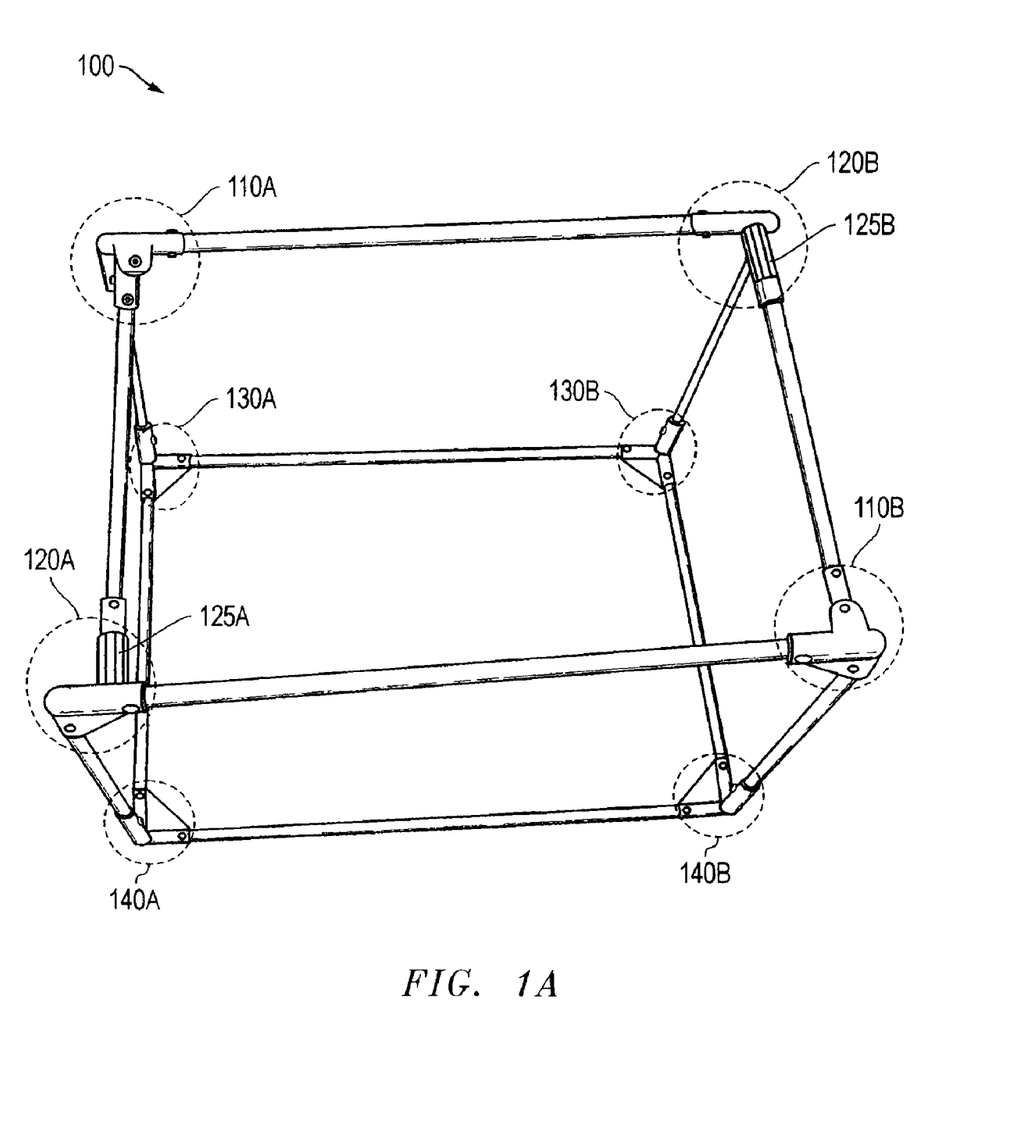
FIG. 1A is a perspective view of a foldable and portable frame in a fully erected position according to the present invention.

Now referring to FIG. 1A, a perspective view of a foldable and portable frame 100 in a fully erected position according to the present invention is illustrated. The foldable and portable frame 100 in the fully erected position is a substantially rectangular structure comprising eight joint structures and twelve connecting posts. This foldable and portable frame 100 in this FIG. 1A is so positioned for the convenience of description. A person of the ordinary skill in the art will understand, the foldable and portable frame 100 can be rotated in any positions.

The eight joint structures are horizontal bending joints (110A and 110B), lock and release linkages (120A and 120B), back vertical bending joints (130A and 130B), and front vertical bending joints (140A and 140B). Each joint is further described in the following paragraphs. As shown in FIG. 1A, each of the lock and release linkages (120A and 120B) comprises a lock and release set (125A or 125B) operational for locking or releasing of the corresponding lock and release linkage (120A or 120B).

Figure 1B:
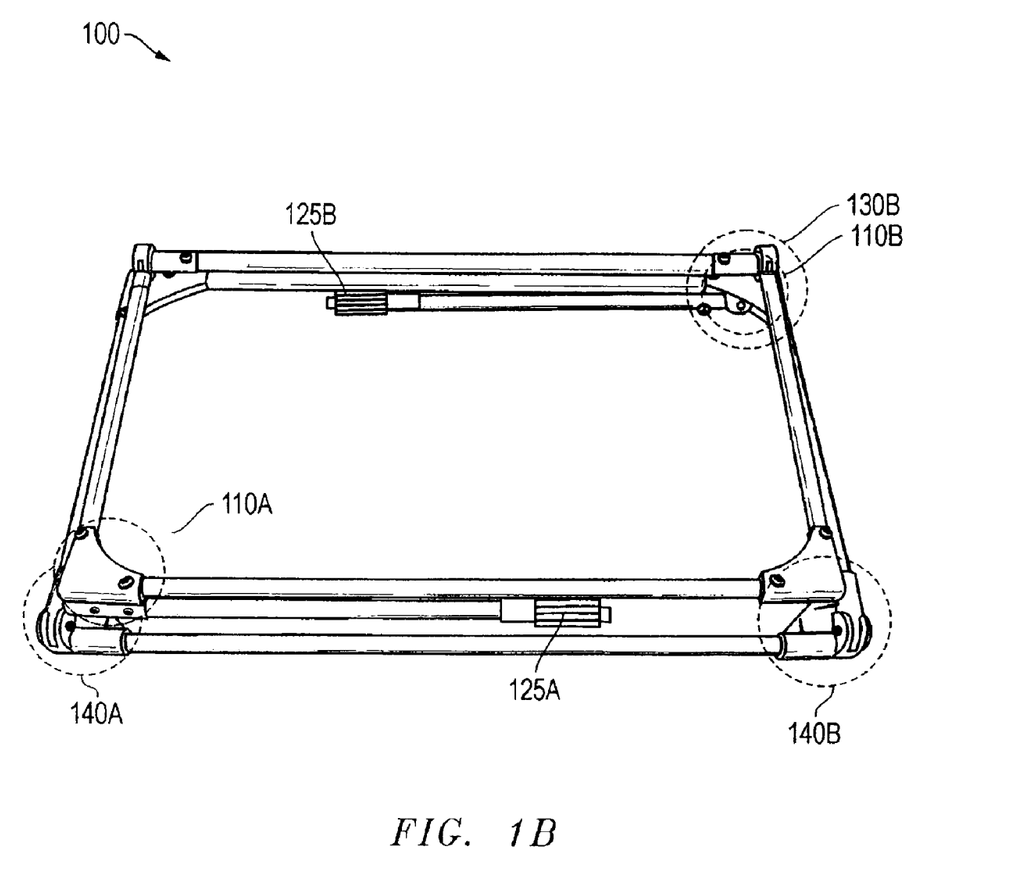
FIG. 1B is a perspective view of the foldable and portable frame in a folded position according to the present invention.

FIG. 1B is a perspective view of the foldable and portable frame 100 in a folded position according to the present invention. As shown in FIG. 1B, the lock and release sets (125A and 125B) are shown released from the corresponding lock and release linkages (120A and 120B) (shown in FIG. 1A) with the lock and release sets (125A and 125B) positioned in a bended horizontal position. As shown in FIG. 1B, the horizontal bending joint 110B is bended, folded down, and rests on the top of the back vertical bending joint 130B. Further, the horizontal bending joint 110A is bended, folded down, and rests on the top of the front vertical bending joint 140A. The front vertical bending joint 140B is also visible in a bended position.

Referring again to FIGS. 1A and 1B, illustrating the mechanism of folding and erecting of the foldable and portable frame 100. As shown in FIG. 1A, the foldable and portable frame 100 is fully erected. To fold the foldable and portable frame 100, the lock and release sets (125A and 125B) is released from the lock and release linkages (120A and 120B) as described below in FIG. 2B. The lock and release sets (125A and 125B) is then folded inwardly as shown in FIG. 1B. The front vertical bending joints (140A and 140B) and connecting posts is then folded vertically inward until the horizontal bending joint 110B rests on the top of the back vertical bending joint 130B (shown in FIG. 1B) and the disengaged part of the lock and release linkage 120A rests on the top of the back vertical bending joint 130A (not visible in FIG. 1B).

Next, the back vertical bending joints (130A and 130B) and connecting posts is folded vertically inward until the horizontal bending joint 110A rests on the top of the front vertical bending joint 140A (shown in FIG. 1B) and the disengaged part of the lock and release linkage 120B rests on the top of the front vertical bending joint 140B (shown in FIG 1B). Because of the height differential of the holders between the front vertical bending joints (140A and 140B) and the back vertical bending joints (130A and 130B) as described above, the foldable and portable frame 100 can be folded in such a sequence that all posts are substantially parallel to each other. As a result, the foldable and portable frame 100 is folded in a compacted form that is easily portable.

A person of ordinary skill in the art will understand, a reverse sequence can be performed to erect the foldable and portable frame 100. In addition, a person of ordinary skill in the art will also understand, the height differential of the holders between the front vertical bending joints (140A and 140B) and the back vertical bending joints (130A and 130B) can be reversed. In this embodiment, the folding sequence can also be adjusted by folding the back vertical bending joints (130A and 130B) followed by folding the front vertical bending joints (140A and 140B).

Figure 2A:
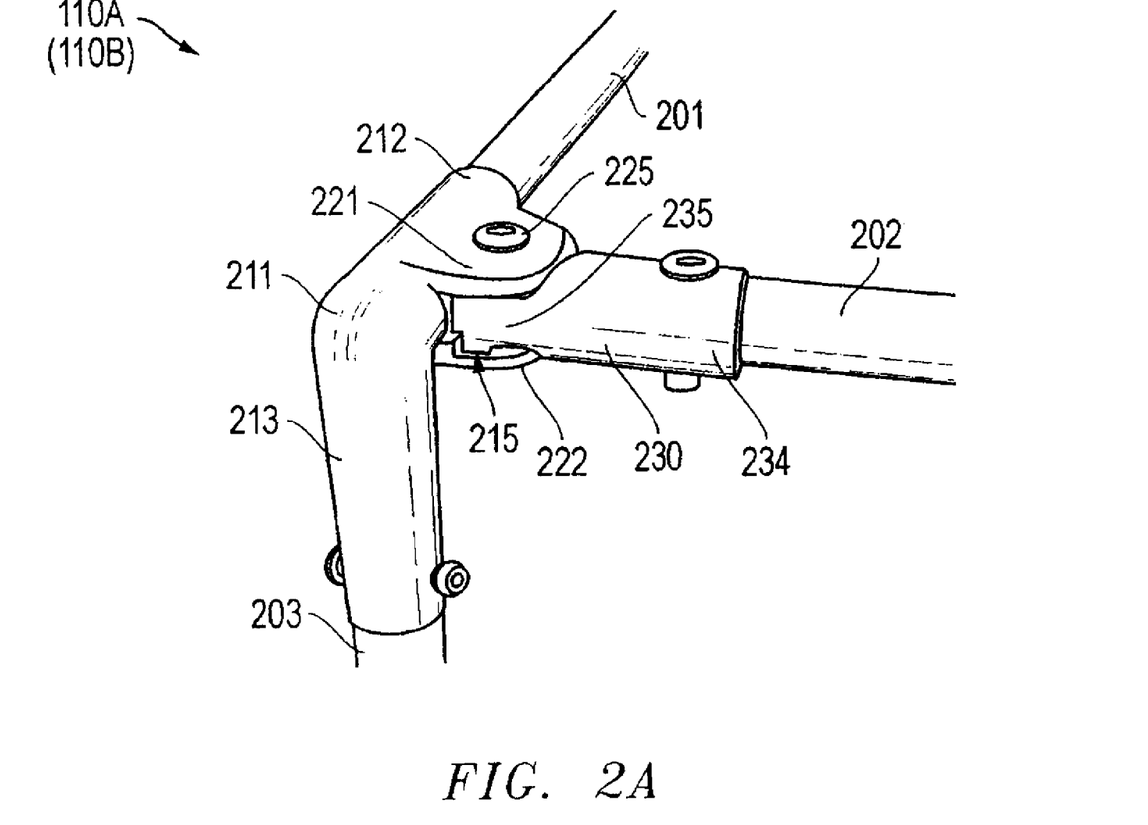
FIG. 2A is an detailed view of a horizontal bending joint for the foldable and portable frame according to the present invention.

Now referring to FIG. 2A, a detailed view of one of the horizontal bending joints (110A and 110B) is illustrated. In FIG. 2A, the horizontal bending joint (110A or 110B) comprises a holder 211 and a pivotal horizontal post receiver 230. As shown in FIG. 2A, the holder 211 further comprises several integral parts including a front-to-back post receiver 212, which is connected to a front-to-back post 201; a vertical post receiver 213, which is connected to a vertical post 203, and an upper retainer 221 and a lower retainer 222.

The pivotal horizontal post receiver 230 comprises a first end 234 connected to a horizontal post 202; a second end 235 inserted between the upper retainer 221 and the lower retainer 222 and pivotally connected to the upper retainer 221 and the lower retainer 222 with a nut & bolt set 225 (only top portion of the bolt is visible in this figure); and a stopping knob 215, serving as a hindrance point to prevent the pivotal horizontal post receiver 230 from over bending and keep the pivotal horizontal post receiver 230 substantially perpendicular to the front-to-back post 201 and the vertical post 203 when the foldable and portable frame 100 (shown in FIG. 1A) is fully erected.

Together with the upper retainer 221 and the lower retainer 222, the stopping knob 215 allows the pivotal horizontal post receiver 230 to be flexibly bended substantially between 0 and 90 degrees in relationship with the front-to-back post receiver 212 and the front-to-back post 201. The nut & bolt set 215 serves as an axis allowing the pivotal horizontal post receiver 230 to be bended as described above.

A person of ordinary skill in the art will understand, any method of connection can be applied to the connections between the first end 234 and the horizontal post 202; the front-to-back post receiver 212 and the front-to-back post 201; and the vertical post receiver 213 and the vertical post 203. In addition, each of these connections can be an integral connection which form each connection a single member. A person of ordinary skill in the art will also understand, any methods of connections can be applied to other connections of the frame 100, and each of these connections can be an integral connection which form each connection a single member.

Figure 2B:
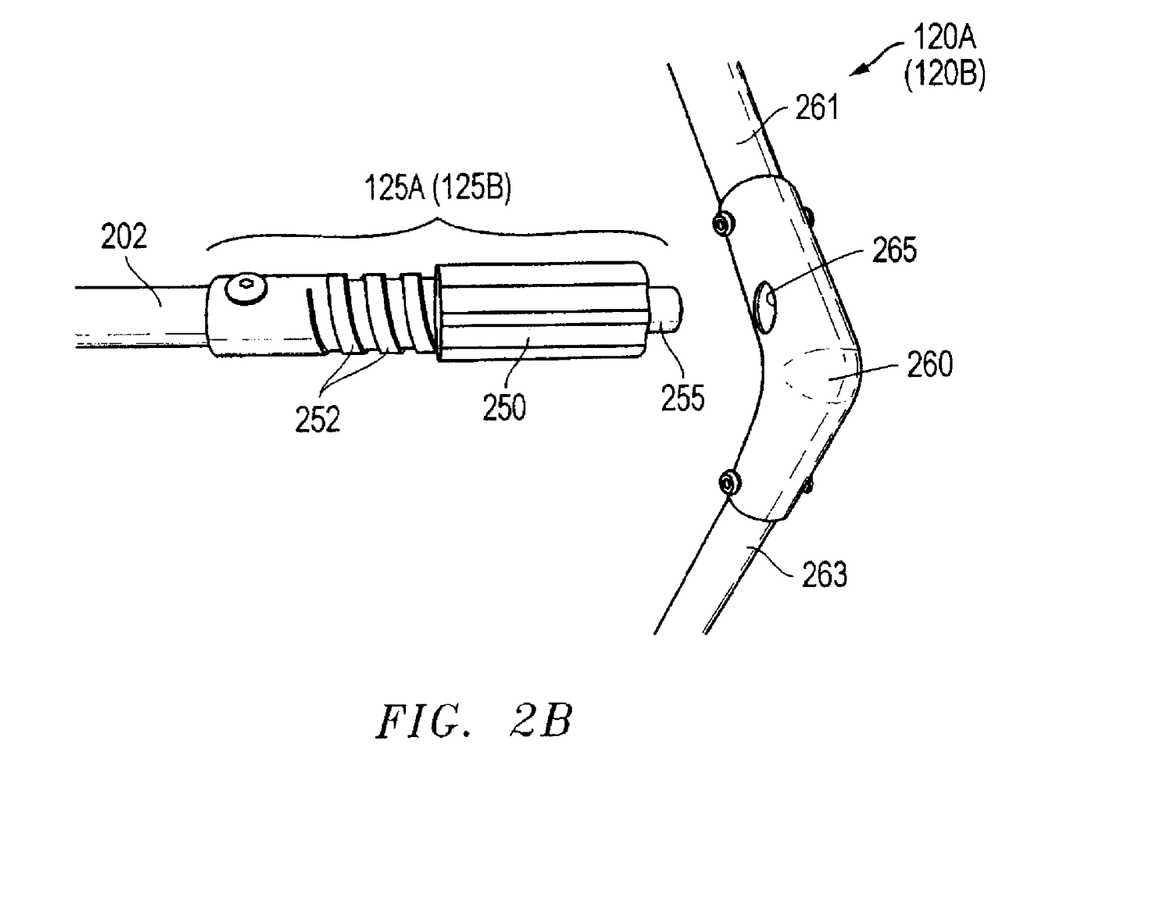
FIG. 2B is an detailed view of a lock and release linkage in a release position for the foldable and portable frame according to the present invention.

Now referring to FIG. 2B, an detailed view of the lock and release linkage (120A or 120B) in a release position for the foldable and portable frame 100 according to the present invention is illustrated. The lock and release linkage (120A or 120B) comprises a receiver 260 and a lock and release set (125A or 125B). As shown in FIG. 2B, the receiver 260 is an L-shape tubing structure connecting to a front-to-back post 261 and a vertical post 263. The receiver 260 also comprises a receiving cavity 265 to receive and engage with the lock and release set (125A or 125B). The lock and release set (125A or 125B) connected to a horizontal post 202 further comprises a screwing thread 252 and a screwing knob 250 with a locking tip 255. The screwing knob 250 can be turned counter-clockwise to elongate the length of the lock and release set (125A or 125B). As a result, the locking tip 255 of the screwing knob 250 is inserted into the receiving cavity 265 of the receiver 260 thereby locking the lock and release set (125A or 125B) to the receiver 260. In contrast, the screwing knob 250 can be turned clockwise to shorten the length of the lock and release set (125A or 125B) so that the locking tip 255 of the screwing knob 250 can be disengaged from the receiving cavity 265 of the receiver 260 thereby the lock and release set (125A or 125B) is separated from the receiver 260 as shown in FIG. 2B.

Figure 3A:
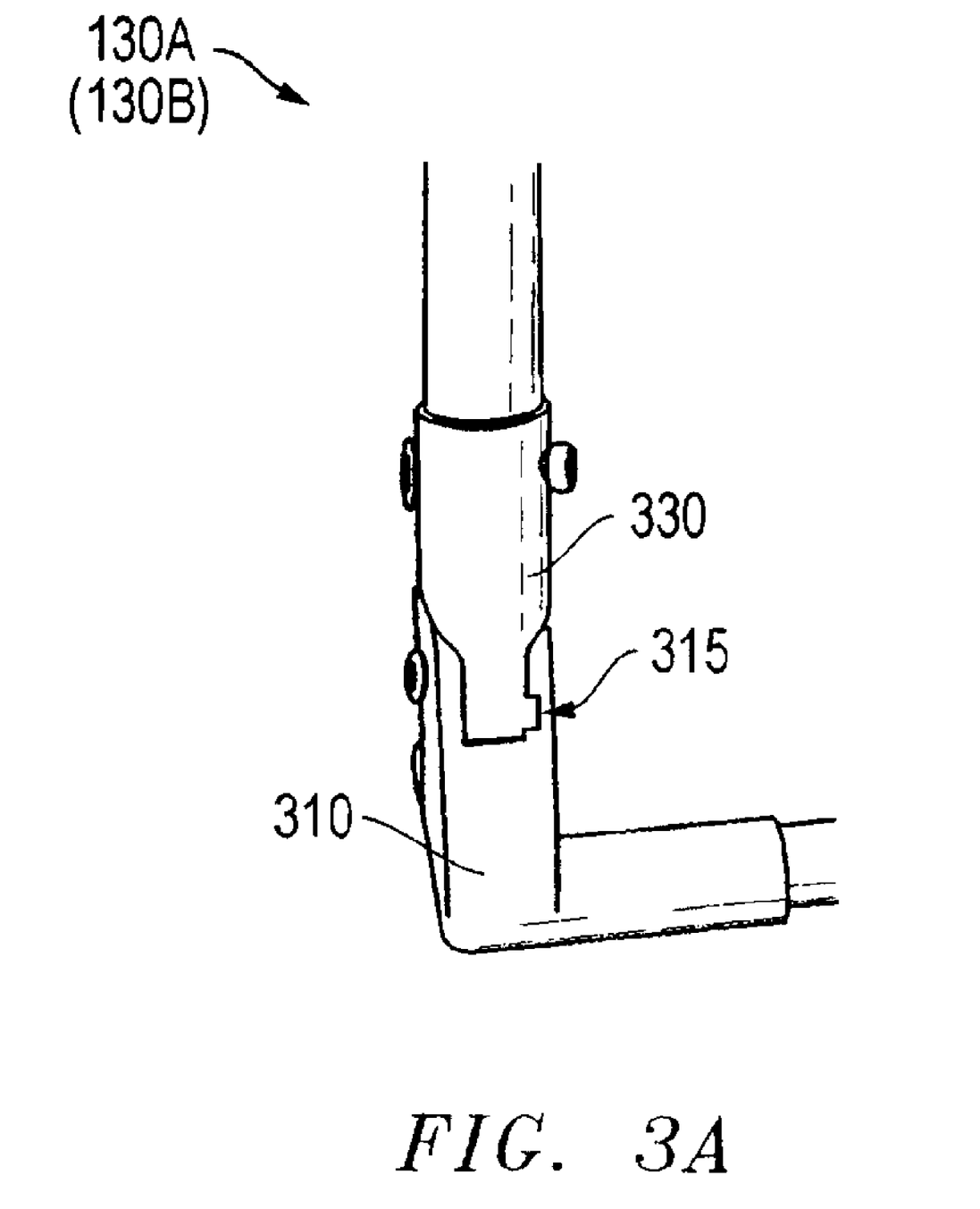
FIGS. 3A and 3B are detailed outside and inside views of a back vertical bending joint for the foldable and portable frame according to the present invention.
Figure 3B:
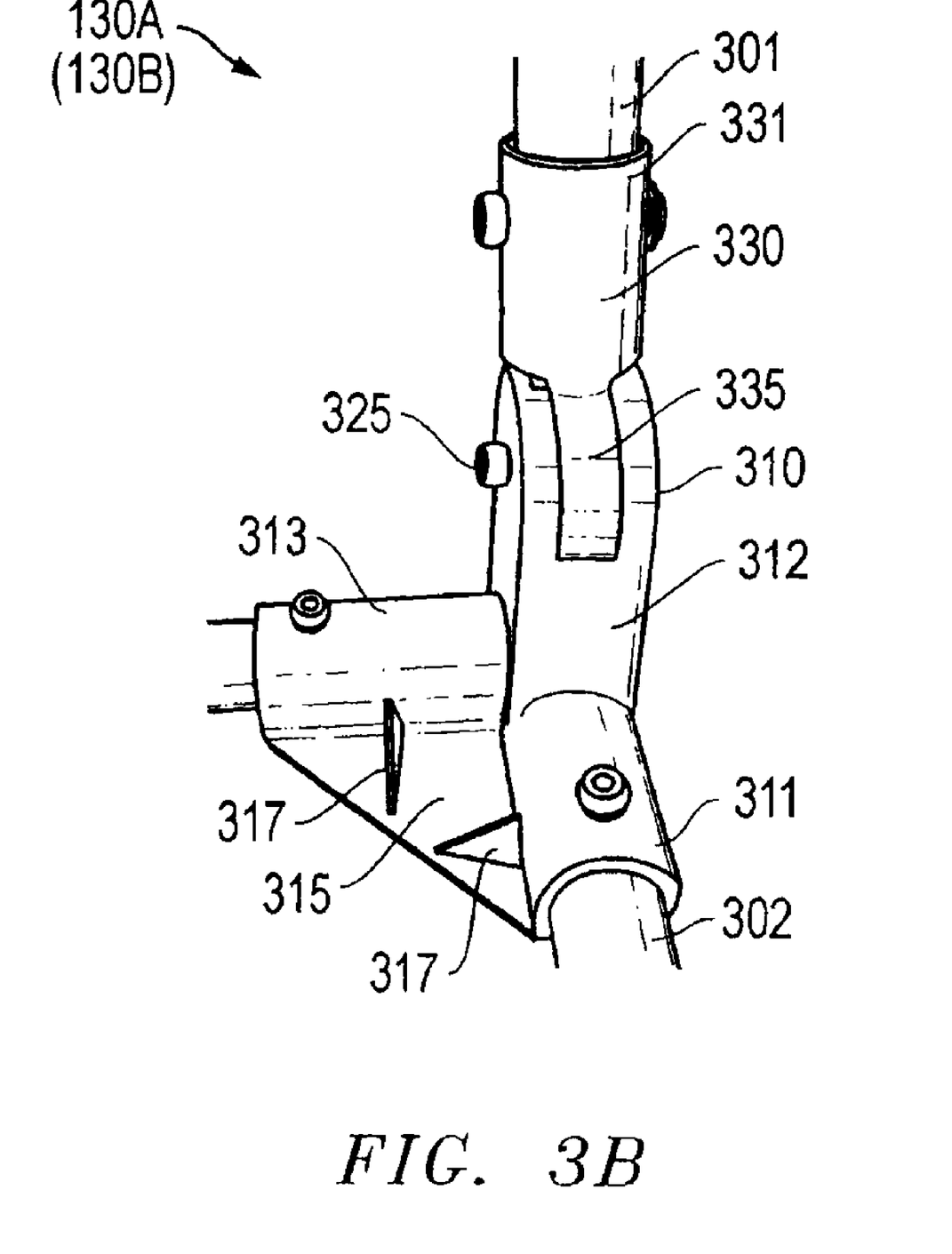

Now referring to FIGS. 3A and 3B, detailed outside and inside views of the back vertical bending joint (130A or 130B) are illustrated. FIG. 3A is an outside view of the back vertical bending joint (130A or 130B), which is structurally similar to the structure of the horizontal bending joint (110A or 110B) shown in FIG. 2A. The back vertical bending joint (130A or 130B) shown in FIG. 3A comprises a pivotal vertical post receiver 330, which further comprises a stopping knob 315, and a holder 310.

Now turning attention specifically to FIG. 3B, an inside view of the back vertical bending joint (130A or 130B), which comprises the pivotal vertical post receiver 330 and a holder 325. The pivotal vertical post receiver 330 further comprises a first end 331 connected to a vertical post 301; and a second end 335, which is received by and engaged with the holder 310 by a pivotal bolt & nut set 325. This structure of the pivotal connection is similar to the connection shown in FIG. 2A.

FIG. 3B also shows the structure of the holder 310. The holder 310 comprises several integral parts including a horizontal post receiver 313, a front-to-back post receiver 311, a reinforcing plate 315, and two reinforcing tabs 317.

Also shown in FIG. 3B, the holder 310 further comprises a holder body 312. The height of the holder body 312 substantially equals the diameter of the pivotal vertical post receiver 330. The height of the holder body 312 is so designed that when pivotal vertical post receiver 330 is fully bended down toward the front-to-back post receiver 311, the pivotal vertical post receiver 330 and a connecting post 301 is substantially parallel to the front-to-back post receiver 311 and a connecting post 302.

The structure of the front vertical bending joint (140A or 140B shown in FIG. 1A) is generally the same as the structure of the back vertical bending joint (130A or 130B shown in FIGS. 3A and 3B). However, the front vertical bending joint (140A or 140B shown in FIG. 1A) and the back vertical bending joint (130A or 130B) shown in FIGS. 3A and 3B differ slightly in that the height of the holder body for the front vertical bending joint (140A or 140B) is approximately double of the height of the holder body 312 of the holder 310 of the back vertical bending joint (130A or 130B). This is designed so that when the vertical posts are bended down, the vertical posts are substantially parallel to each other and to the horizontal posts. With such a design, the foldable and portable frame 100 is folded neatly and easily portable.

Figure 4A:
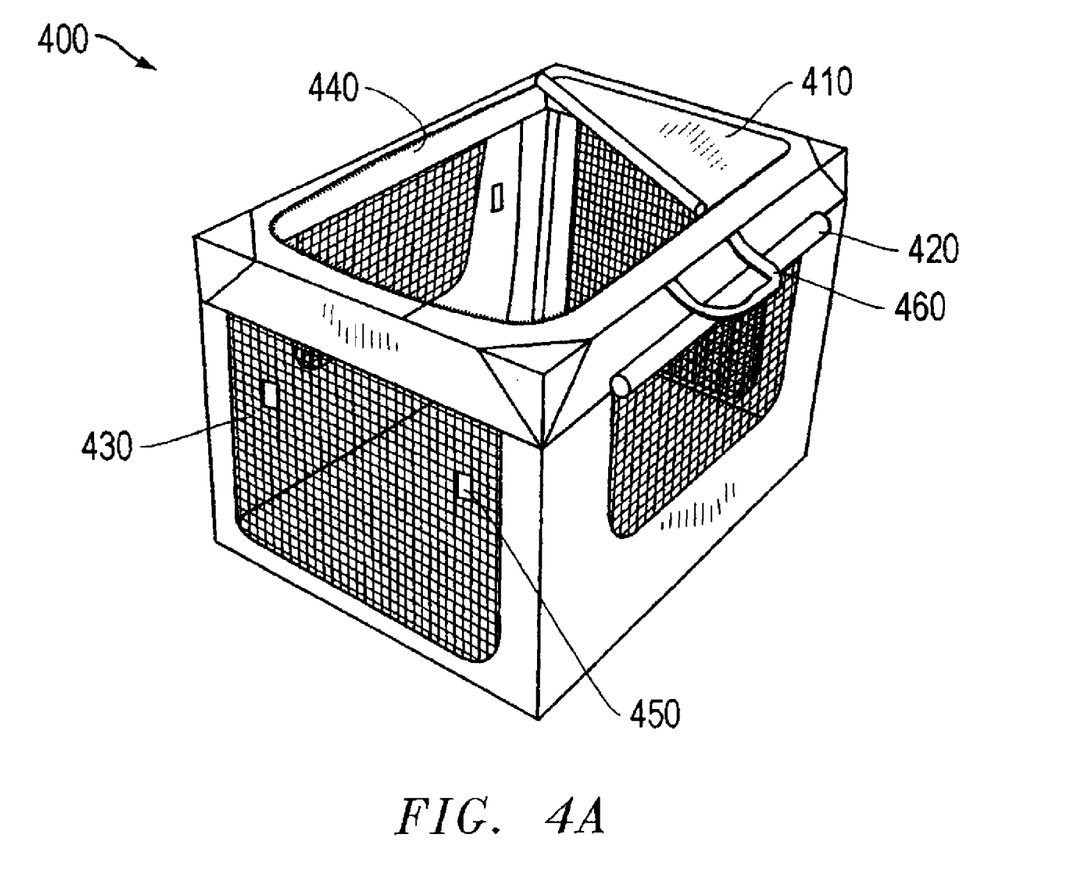
FIGS. 4A, 4B, 4C, and 4D are perspective views of a covered foldable and portable frame and a folding mechanism for the covered foldable and portable frame according to the present invention.

Now referring to FIGS. 4A, 4B, 4C, and 4D, perspective views of a covered foldable and portable frame 400 and a folding mechanism for the covered foldable and portable frame 400 according to the present invention are illustrated. As shown in FIG. 4A, the foldable and portable frame 100 (shown in FIG. 1A, but not visible in FIG. 4A) is served as a supporting structure for the covered foldable and portable frame 400. In one embodiment, a flexible covering 470 is sized to extend over an entirety of the foldable and portable frame 100 (not shown in FIG. 4A).

In another embodiment, a flexible covering 470 is sized to extend over an entirety of the foldable and portable frame 100 (not shown in FIG. 4A), and several flexible sleeves cover all the posts of the foldable and portable frame 100. These flexible sleeves 480 can be attached to certain interior portions of the flexible covering 470. As shown in FIG. 4A, the covered foldable and portable frame 400 comprises web shields 430 covering each side of the covered foldable and portable frame 400, rolling covers 420 connected to each top side 425 of each web shield 430, a top cover 410, a closing edge 440, handling strips 460, and several loop & hook fastener sticking tabs 450.

The top cover 410 can be zipped (or using other mechanisms) along the closing edge 440 of the top portion 490 of the covered foldable and portable frame 400. A person of the ordinary skill in the art will understand, other accessories including, but not limited to, pockets, reinforcing pads, and elastic strips, can be connected to any side or top portion of the covered foldable and portable frame 400.

Figure 4B:
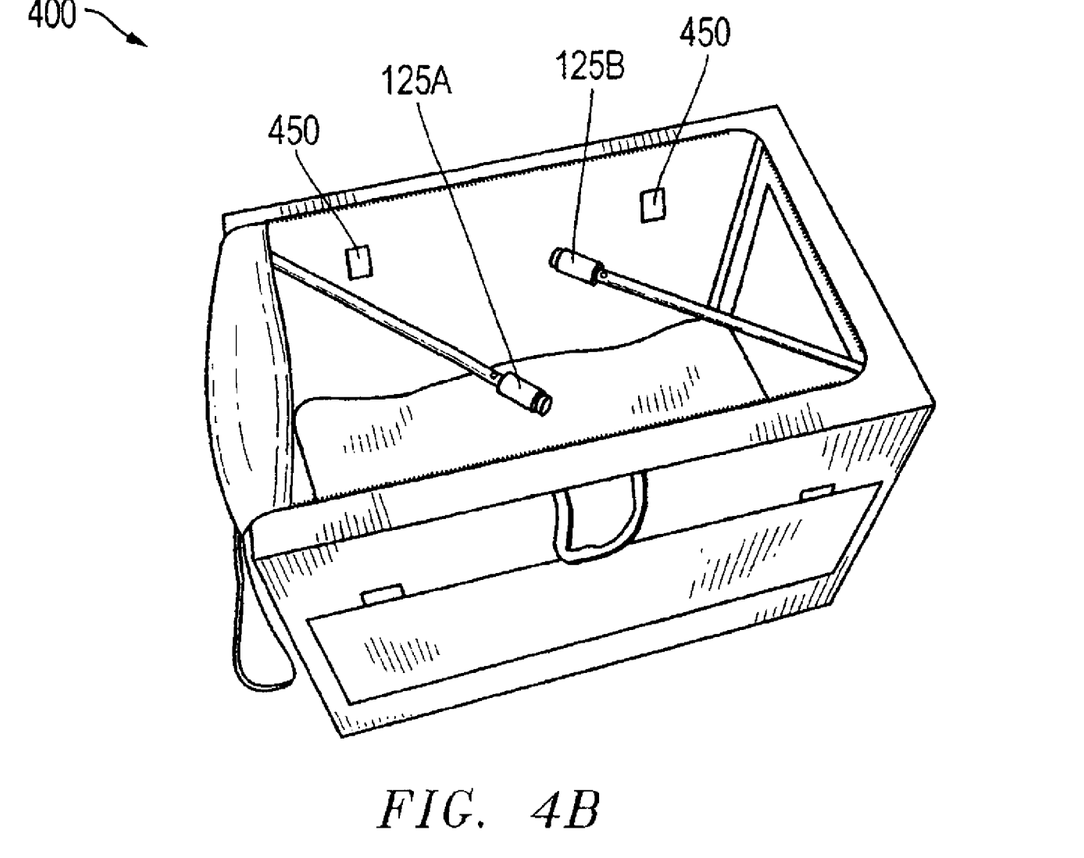
Figure 4C:
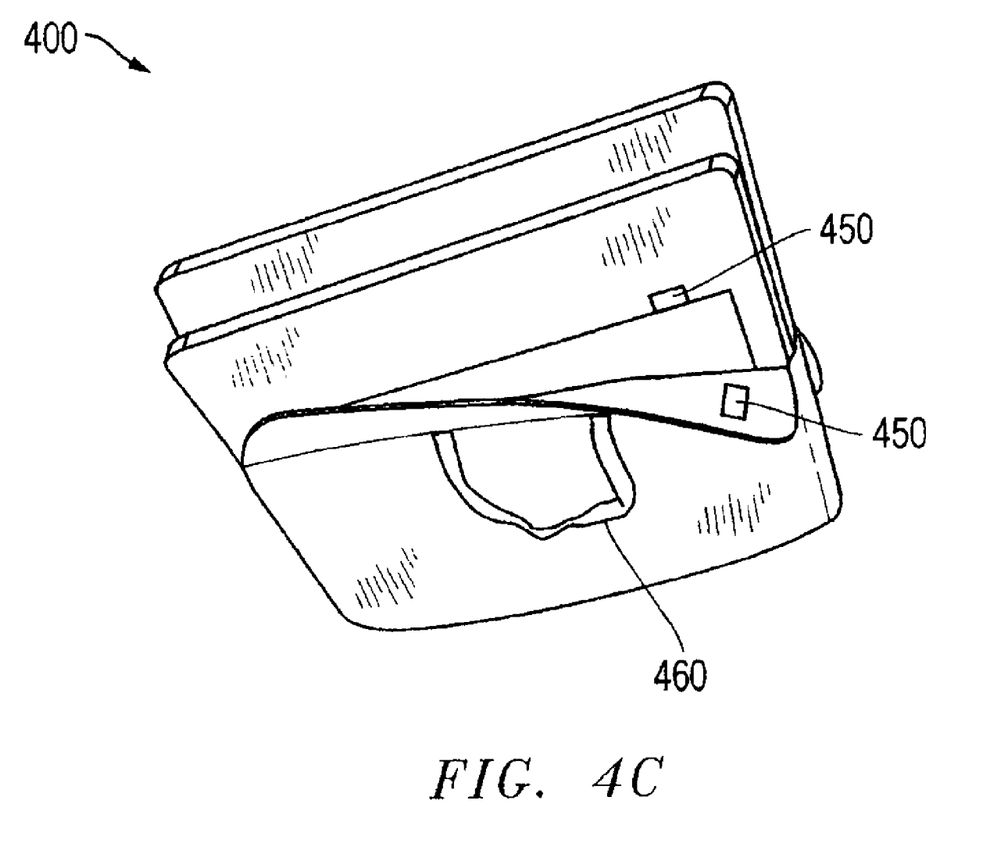

Referring to FIGS. 4B, 4C, and 4D, the same folding fashion for the folding of the foldable and portable frame 100 (see FIGS 1A and 1B) described above is applied to folding of the covered foldable and portable frame 400. Specifically, FIG. 4B shows the lock and release sets (125A and 125B) disengaged from the lock and release linkages 120A and 120B (not visible in FIG. 4B). The loop & hook sticking tabs 450 shown in FIGS. 4A, 4B, and 4C are placed in certain positions to facilitate compacting the covered foldable and portable frame 400 when the foldable and portable frame 100 is fully folded.

Figure 4D:
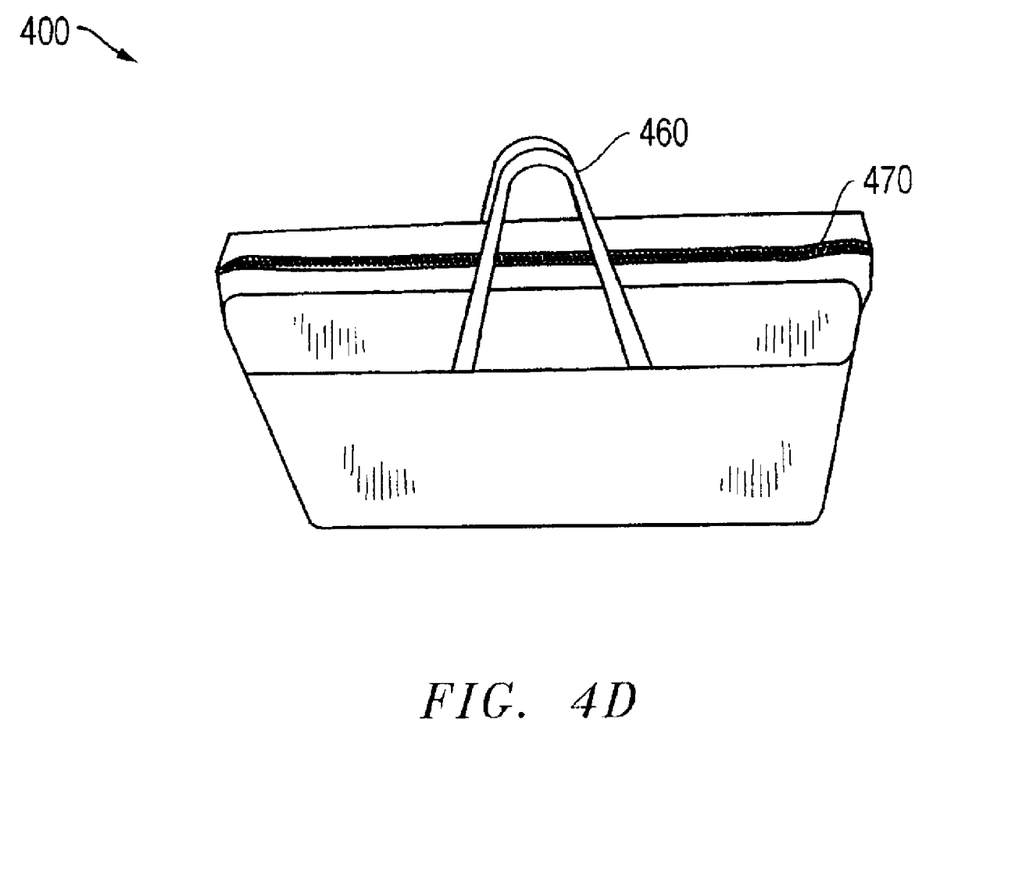

As a result, as shown in FIG. 4D, the covered foldable and portable frame 400 is neatly folded and closed with a sealing means 470. The covered foldable and portable frame 400 can be easily carried around by handling the utilizing strips 460.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A foldable and portable frame, comprising: a rectangular top wherein the rectangular top comprises a first horizontal bending joint; a second horizontal bending joint; a first lock and release linkage; and a second lock and release linkage; a rectangular bottom wherein the rectangular bottom comprises a first back vertical bending; a second back vertical bending joint; a first front vertical bending joint; and a second front vertical bending joint; wherein the rectangular top is connected to the rectangular bottom by four substantially same length vertical posts, wherein the four vertical posts are substantially perpendicular to the rectangular top and the rectangular bottom, thereby forming the foldable and portable frame in a erected state as a substantially rectangular structure and the foldable and portable frame is adapted to be folded in a collapsed state when the first lock and release linkage and the second lock and release linkage are in a released state, and the two horizontal bending joints pivot the two released linkages up to ninety degrees in a horizontal inward fashion, and the first back vertical bending joint and the second back vertical bending joint are folded inwardly toward the rectangular bottom and the first front vertical bending joint and the second front vertical bending joint are folded inwardly toward the rectangular bottom, and each of the front or back vertical bending joints has a reinforcing plate as part of the integral structure of the joint.

2. The foldable and portable frame in claim 1, wherein the first lock and release linkage comprises a lock and release set and a lock and release receiver.

3. The foldable and portable frame in claim 2, wherein the lock and release set comprises: a first end adapted for connecting to a post; a screwing thread, a screwing knob adapted on the screwing thread, and a locking tip integrally connected to the screwing knob, wherein the length of the lock and release set can be elongated or shortened by turning the screwing knob toward a first end of the lock and release set.

4. The foldable and portable frame in claim 2, wherein the lock and release receiver comprises: a first post receiver and a second post receiver wherein the first post receiver and a second post receiver are integrally connected and substantially perpendicular to each other; and a cavity on one side of the first post receiver, wherein the cavity receives the locking tip when the lock and release set is elongated to an extent allowing the lock and release set to lock with the lock and release receiver and the cavity disengages with the locking tip when the lock and release set is shortened allowing the lock and release set to separate from engaging the lock and release receiver.

5. The foldable and portable frame in claim 1, wherein the second lock and release linkage is structurally the same as the first lock and release linkage.

6. The foldable and portable frame in claim 1, wherein the first horizontal bending joint comprises: a holder wherein the holder further comprises a first post receiver and a second post receiver wherein the first post receiver and a second post receiver are integrally connected and substantially perpendicular to each other; a holder body wherein the holder body is substantially perpendicular to a plane formed by the first post receiver and the second post receiver, and a first retainer and a second retainer both integrally is extended from the holder body; and a pivotal horizontal post receiver wherein the pivotal horizontal post receiver further comprises a first end adapted for connecting to a post; a second end adapted for insertion between the first retainer and the second retainer and pivotally connected to the first retainer and the second retainer; and a stopping knob on the second end; thereby the holder receives and pivotally connected to the pivotal horizontal post receiver allowing the pivotal horizontal post receiver to be bent toward the first post receiver of the holder; and the stopping knob, together with the first retainer and the second retainer, functions to restrict the pivotal horizontal post receiver to be flexibly bent substantially between 0 and 90 degrees in relationship with the first post receiver.

7. The foldable and portable frame in claim 1, wherein the second horizontal bending joint is substantially the same structure as the first horizontal bending joint.

8. The foldable and portable frame in claim 1, wherein the first back vertical bending joint comprises a holder wherein the holder further comprises a first post receiver and a second post receiver wherein the first post receiver and a second post receiver are integrally connected and substantially perpendicular to each other; a holder body wherein the holder body is substantially perpendicular to a plane formed by the first post receiver and the second post receiver; a first retainer and a second retainer both integrally extended from the holder body; and a pivotal vertical post receiver wherein the pivotal vertical post receiver further comprising: a first end adapted for connecting to a post; a second end adapted for insertion between the first retainer and the second retainer and pivotally connected to the first retainer and the second retainer; and a stopping knob on the second end, thereby the holder receives and pivotally connected to the pivotal vertical post receiver allowing the pivotal vertical post receiver to be bent toward the first post receiver of the holder; and the stopping knob, together with the first retainer and the second retainer, functions to restrict the pivotal vertical post receiver to be flexibly bent substantially between 0 and 90 degrees in relationship with the first post receiver.

9. The foldable and portable frame in claim 1, wherein the second vertical bending joint is substantially the same structure as the first vertical bending joint.

10. The foldable and portable frame in claim 1, wherein the first front vertical bending joint is substantially similar to the first back vertical bending joint.

11. A foldable and portable frame, comprising: a rectangular top wherein the rectangular top comprises a first horizontal bending joint; a second horizontal bending joint; a first lock and release linkage; and a second lock and release linkage; a rectangular bottom wherein the rectangular bottom comprises a first back vertical bending; a second back vertical bending joint; a first front vertical bending joint; and a second front vertical bending joint; wherein the rectangular top is connected to the rectangular bottom by four substantially same length vertical posts wherein the four vertical posts are substantially perpendicular to the rectangular top and the rectangular bottom, thereby forming the foldable and portable frame in a erected state as a substantially rectangular structure; a flexible covering sized to extend over an entirety of the foldable and portable frame thereby forming a stable substantially rectangular housing; and the foldable and portable frame is adapted to be folded in a collapsed state when the first lock and release linkage and the second lock and release linkage are in a released state, and the two horizontal bending joints pivot the two released linkages up to ninety degrees in a horizontal inward fashion, the first back vertical bending joint and the second back vertical bending joint are folded inwardly toward the rectangular bottom; and the first front vertical bending joint and the second front vertical bending joint are folded inwardly toward the rectangular bottom, and each of the front or back vertical bending joints has a reinforcing plate as part of the integral structure of the joint.

12. The foldable and portable frame in claim 11, wherein the first lock and release linkage comprises a lock and release set and a lock and release receiver.

13. The foldable and portable frame in claim 12, wherein the lock and release set comprises: a first end adapted for connecting to a post; a screwing thread; a screwing knob adapted on the screwing thread, and a locking tip integrally connected to the screwing knob, wherein the length of the lock and release set can be elongated or shortened by turning the screwing knob toward a first end of the lock and release set.

14. The foldable and portable frame in claim 12, wherein the lock and release receiver comprises: a first post receiver and a second post receiver wherein the first post receiver and a second post receiver are integrally connected and substantially perpendicular to each other; and a cavity on one side of the first post receiver; wherein the cavity receives the locking tip when the lock and release set is elongated to an extent allowing the lock and release set to lock with the lock and release receiver; and the cavity disengages with the locking tip when the lock and release set is shortened allowing the lock and release set to separate from engaging the lock and release receiver.

15. The foldable and portable frame in claim 11, wherein the second lock and release linkage is structurally the same as the first lock and release linkage.

16. The foldable and portable frame in claim 11, wherein the first horizontal bending joint comprises: a holder wherein the holder further comprises: a first post receiver and a second post receiver wherein the first post receiver and a second post receiver are integrally connected and substantially perpendicular to each other; a holder body wherein the holder body is substantially perpendicular to a plane formed by the first post receiver and the second post receiver, and a first retainer and a second retainer both integrally extended from the holder body; and a pivotal horizontal post receiver wherein the pivotal horizontal post receiver further comprises: a first end adapted for connecting to a post; a second end adapted for insertion between the first retainer and the second retainer and pivotally connected to the first retainer and the second retainer; and a stopping knob on the second end; thereby the holder receives and is pivotally connected to the pivotal horizontal post receiver allowing the pivotal horizontal post receiver to be bent toward the first post receiver of the holder; and the stopping knob, together with the first retainer and the second retainer, functions to restrict the pivotal horizontal post receiver to be flexibly bended substantially between 0 and 90 degrees in relationship with the first post receiver.

17. The foldable and portable frame in claim 11, wherein the second horizontal bending joint is substantially the same structure as the first horizontal bending joint.

18. The foldable and portable frame in claim 11, wherein the first back vertical bending joint comprises: a holder wherein the holder further comprises: a first post receiver and a second post receiver wherein the first post receiver and a second post receiver are integrally connected and substantially perpendicular to each other; a holder body wherein the holder body is substantially perpendicular to a plane formed by the first post receiver and the second post receiver, and a first retainer and a second retainer both integrally extended from the holder body; a pivotal vertical post receiver wherein the pivotal vertical post receiver further comprises: a first end adapted for connecting to a post; a second end adapted for insertion between the first retainer and the second retainer and pivotally connected to the first retainer and the second retainer; and a stopping knob on the second end; thereby the holder receives and pivotally connected to the pivotal vertical post receiver allowing the pivotal vertical post receiver to be bent toward the first post receiver of the holder; and the stopping knob, together with the first retainer and the second retainer, functions to restrict the pivotal vertical post receiver to be flexibly bended substantially between 0 and 90 degrees in relationship with the first post receiver.

19. The foldable and portable frame in claim 11, wherein the second vertical bending joint is substantially the same structure as the first vertical bending joint.

20. The foldable and portable frame in claim 11, wherein the first front vertical bending joint is substantially similar to the first back vertical bending joint.

21. The foldable and portable frame in claim 11, wherein the flexible covering is attached to the foldable and portable frame thereby the flexible covering is foldable and portable together with the foldable and portable frame.

22. The foldable and portable frame in claim 11, wherein the flexible covering further comprises: a plurality of accessories wherein each of the plurality of accessories is attached on an exterior portion of the flexible covering.

23. The foldable and portable frame in claim 11, wherein the foldable and portable frame further comprises a plurality of web shields, rolling covers connected to each top side of each web shield, a top cover, a closing edge, handling strips, and a plurality of loop & hook fastener sticking tabs.

24. The foldable and portable frame in claim 23, wherein the flexible covering further comprises: a plurality of flexible accessories wherein each of the plurality of accessories is attached on an exterior portion of the flexible covering.

25. The foldable and portable frame in claim 24, wherein the plurality of flexible accessories are selected from the group consisting of pockets, elastic strips, handling strips, loop & hook sticking tabs, openings operated by zippers, openings operated by loop & hook sticking mechanisms, and web shields.

* * * * *